(12) United States Patent
Weiss et al.

(10) Patent No.: US 7,707,097 B1
(45) Date of Patent: Apr. 27, 2010

(54) FULLY TRANSPARENT COMMISSION CALCULATOR AND DISPLAY SYSTEM

(75) Inventors: Joel Weiss, Monsey, NY (US); Timothy H Heaton, Morriston, NJ (US)

(73) Assignee: BGC Partners, Inc., New York, NY (US)

(*) Notice: Subject to any disclaimer, the term of this patent is extended or adjusted under 35 U.S.C. 154(b) by 1408 days.

(21) Appl. No.: 10/345,466

(22) Filed: Jan. 14, 2003

(51) Int. Cl.
G06Q 40/00 (2006.01)

(52) U.S. Cl. .......................... 705/37; 705/26; 705/27; 705/36; 705/80; 364/401; 364/403

(58) Field of Classification Search .................. 705/37, 705/80, 36, 26–27; 364/403, 401
See application file for complete search history.

(56) References Cited

U.S. PATENT DOCUMENTS

| | | | |
|---|---|---|---|
| 5,414,624 | A | 5/1995 | Anthonyson |
| 5,905,974 | A | 5/1999 | Fraser et al. |
| 5,918,218 | A * | 6/1999 | Harris et al. .................. 705/37 |
| 6,029,146 | A | 2/2000 | Hawkins et al. |
| 6,560,580 | B1 | 5/2003 | Fraser et al. |
| 6,618,707 | B1 | 9/2003 | Gary |
| 6,662,164 | B1 | 12/2003 | Koppelman et al. |
| 6,850,907 | B2 | 2/2005 | Lutnick et al. |
| 7,165,048 | B2 * | 1/2007 | Heppenstall, Jr. ............. 705/37 |
| 7,251,620 | B2 * | 7/2007 | Walker et al. ................. 705/26 |
| 7,472,087 | B2 * | 12/2008 | Keith .......................... 705/37 |
| 2002/0055901 | A1 | 5/2002 | Gianakouros et al. |
| 2002/0161690 | A1 * | 10/2002 | McCarthy et al. ............. 705/37 |
| 2002/0169703 | A1 | 11/2002 | Lutnick et al. |
| 2003/0018557 | A1 | 1/2003 | Gilbert et al. |
| 2003/0139997 | A1 | 7/2003 | Ginsberg |
| 2003/0229571 | A1 * | 12/2003 | May .......................... 705/37 |
| 2003/0233307 | A1 * | 12/2003 | Salvadori et al. ............. 705/37 |
| 2003/0233309 | A1 * | 12/2003 | Matus et al. ................. 705/37 |
| 2004/0088242 | A1 | 5/2004 | Ascher et al. |
| 2004/0162772 | A1 * | 8/2004 | Lewis ......................... 705/34 |
| 2004/0254804 | A1 | 12/2004 | Peterffy et al. |
| 2005/0102219 | A1 | 5/2005 | Taylor et al. |
| 2006/0080222 | A1 | 4/2006 | Lutnick et al. |

FOREIGN PATENT DOCUMENTS

WO    WO 2004/042514    5/2004

OTHER PUBLICATIONS

USPTO Office Action for U.S. Appl. No. 11/213,601, Apr. 14, 2008 (6 pages).

(Continued)

*Primary Examiner*—Harish T. Dass
(74) *Attorney, Agent, or Firm*—David E. Boundy

(57) ABSTRACT

The present invention is related to systems and methods for implementing commission allocations in transaction management of auction-based trading for specialized items such as interest-rate-related instruments. In accordance with these systems and methods, a plurality of workstations that are connected to a server, and a structured commission allocation protocol may be provided. Through the workstations, the server, and the commission allocation protocol, the systems and methods may allocate commissions or fees when trading securities at accelerated levels with minimal errors and costs, control commission elements during real-time trading, and distribute commission and transaction data in real time.

41 Claims, 9 Drawing Sheets

OTHER PUBLICATIONS

USPTO Office Action for U.S. Appl. No. 11/213,601, Aug. 26, 2008 (13 pages).

U.S. Appl. No. 12/115,313, filed May 5, 2008, Lutnick, et al.

USPTO Office Action for U.S. Appl. No. 10/023,241; 10 pages; Jul. 7, 2008.

USPTO Office Action for U.S. Appl. No. 10/023,241; 10 pages; Oct. 15, 2007.

USPTO Office Action for U.S. Appl. No. 10/023,241; 20 pages; Dec. 18, 2006.

USPTO Office Action for U.S. Appl. No. 10/023,241; 12 pages; Jun. 5, 2007.

Smart Computing "Buy & Sell Stock Online"; Recreation Jul. 2000, vol. 6 Issue 7; pp. 116-121 in print issue.

Broker.com, Graduate School of Business Stanford University. Case EC-13, Apr. 26, 2000.

International Search report for International Patent Application No. PCT/US02/39235; 1 page Mar. 7, 2003.

U.S. PTO Office Action for U.S. Appl. No. 11/213,601; 15 pages; 6/18/9.

USPTO Office Action for U.S. Appl. No. 10/023,241; 13 pages; Apr. 9, 2009.

Attachment "Forex Software Solutions"—PDF Format.

U.S. PTO Office Action for U.S. Appl. No. 12/115,313; 6 pages; 8/6/9.

* cited by examiner

|  | bid | offer | size | | commission |
|---|---|---|---|---|---|
|  |  |  | bid | offer |  |
| 2 year |  |  |  |  |  |
| 5 year | 100.19 | 100.22 (801) | 100 | 200 | 0 |
| 10 year |  |  |  |  |  |
| 30 year |  |  |  |  |  |

| customer id | 0021645 |
|---|---|
| commission agreement | master |
| aggressor | no |
| instrument liquidity | high |
| total volume entered into | 3400 |
| total number traded | 1000 |

Monday, April 1, 2002 2:37 pm

FIG. 8

FULLY TRANSPARENT COMMISSION CALCULATOR AND DISPLAY SYSTEM

BACKGROUND OF THE INVENTION

This invention relates to the calculating and displaying of commissions relating to the trading of financial instruments. Specifically, this invention relates to the calculating and displaying of commissions charged for trading variable or fixed interest-rate-related instruments—e.g., United States Treasury Bonds, Notes, or Bills, United Kingdom Gilts, European government bonds, and emerging market debts, swaps, repos, etc.

In non-electronic trading of interest-rate-related instruments, two classes of individuals are typically involved in the trading: traders and brokers. Typically, traders purchase or sell the securities or instruments. Brokers match traders acting as buyers to traders acting as sellers in order to facilitate the purchase or sale of the interest-rate-related instrument. The purchase, sale, or other transaction involving the interest-rate-related instruments is known, and referred to herein as a trade.

Historically, one of the problems associated with this system was the lack of direct communication between the two traders transacting the trade of the interest-rate-related instrument. This lack of direct communication allows the broker to fictionalize one side of the trade to the counterparty on the other side of the trade. This fictionalization allows the broker to decrease the actual spread between a buy and a sell position while maintaining the positions of the parties as perceived by the parties themselves.

For example, assume that a seller had taken a position that he would not sell a particular interest-rate-related instrument for less than $50 per instrument, while the buyer had taken a position that he would not pay for more than $48 per instrument. At this point in the negotiation, the seller may indicate to the broker that he would accept $49 per instrument while the buyer may indicate to the broker that he would pay $49 per instrument. Nevertheless, the broker may not communicate the respective communications to the respective counterparties. Rather, the broker may inform each counterparty that the other is steadfast in his respective position. Alternatively, the broker may indicate a slight movement, either to an offer to buy of $48.50 from the prospective buyer or to an offer to sell of $49.50 from the seller, or both. Whether the broker has only communicated the first, unchanged, offer or a slightly changed offer, the respective traders may transact the trade of the interest-rate-related instrument at a price other than the price they agreed to. In this particular example, the buyer may believe that he must pay $50 (or $49.50) while the seller may believe he will receive only $48.00 (or $48.50). The $2.00 (or $1.00) between the amount actually received and the actually amount actually paid in each trade becomes excess profits, for the broker over and above the known brokerage fee. Further compounding the problem may be that excess broker profits and the concomitant distortion of the true market price based on the excess profits, are concealed from the buyer and seller.

A similar problem may exist in electronic trading of interest-rate-related instruments as well. In electronic trading, the trading logic used by the trading system or platform (which operates similarly to a voice broker in non-electronic trading) may not be fully disclosed by the system or platform. This lack of full disclosure by the electronic trading system prevents the customers (similar to traders in non-electronic trading) from being fully aware, until perhaps a much later time, of the brokerage charges being charged to them by the electronic trading system.

It would be desirable to provide an electronic trading system and method for the trading of interest-rate-related instruments that fully and clearly discloses the brokerage fees charged to the customers.

It would also be desirable to provide an electronic trading system and method for the trading of interest-rate-related instruments that fully and clearly discloses the brokerage fees charged to the customers in real time. "Real time" should be understood to suggest immediacy, subject only to normal electronic processing delay and interruptions. Whether or not a user experiences a significant delay before receiving information or a response in what the invention contemplates as real time may depend upon the capabilities of the user's system, the server system and any intervening network, or the efficiency of an external data source.

It would also be desirable to provide an electronic trading system and method for the trading of interest-rate-related instruments that informs the customers of the factors which form the basis for the calculation of the brokerage fees.

It would also be desirable to provide an electronic trading system and method for the trading of interest-rate-related instruments that provides an opportunity to customers to influence the factors for the calculation of the brokerage fees charged to the customer.

SUMMARY OF THE INVENTION

It is an object of this invention to provide an electronic trading system and method for the trading of interest-rate-related instruments that fully and clearly discloses the brokerage fees or commissions charged to the customers.

It is a another object of this invention to provide an electronic trading system and method for the trading of interest-rate-related instruments that fully and clearly discloses the brokerage fees or commissions charged to the customers in real time.

It is still another object of this invention to provide an electronic trading system and method for the trading of interest-rate-related instruments that informs the customers of the factors which form the basis for the calculation of the brokerage fees or commissions.

It is yet another object of this invention to provide an electronic trading system and method for the trading of interest-rate-related instruments that provides an opportunity to customers to influence the factors for the calculation of the brokerage fees or commissions charged to the customer.

To better appreciate the following details, the nomenclature is defined below. The illustrative examples herein, but not limited to them, all focus on fixed-income and fixed-income-related instruments, as well as the trading of these instruments—with the volume of a given trade delineated in, but not limited to, dollars—e.g., $25 million of 10-year Treasury Notes.

The following terms are used with the associated definitions:

| | |
|---|---|
| Bid | Dollar or yield amount bid to buy a security (issue) |
| Offer | Dollar or yield amount offered to sell a security (issue) |
| Spread | Difference between best bid(s) -- i.e., highest price limit for buy orders -- and best offer(s) -- i.e., lowest price limit for sell orders |
| Issue | A single or selected class of interest-rate-related securities -- e.g., the most recently issued 10-year Treasury Notes. |
| Participant | A person or controlling entity receiving data on trading and responding thereto. While the participant is often a terminal |

-continued

| | |
|---|---|
| | operator or broker acting on behalf of a customer (e.g., a trader), this is not the only arrangement. For example, the customers may interact as participants directly. Other arrangements are also possible. |
| Hit | Accept a pending Bid |
| Take or Lift | Accept a pending Offer |
| Size | The number of issues of a particular bid/offer |

The above and other objects of the present invention are preferably realized in a computer-based data processing system for displaying and adjusting trade information as well as commission information relating to a trade. The data processing system may further calculate a commission based on the trade and display it, along with the trade and commission information to a user of such a system. The data processing system employs a plurality of trading workstations linked with a server for coordinated data flow and processing. The system may display the commissions on electronically executed trades of, preferably primarily although not necessarily, interest-rate-related instruments, and may include: a processor adapted to calculate a commission of a selected trade of such an instrument, workstations adapted to display the commission of the selected trade prior to, during, or after the execution of the trade. The workstations may also be adapted to display and allow the user to modify the factors relating to calculation of the commission.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 8 is an illustration of an interactive view region that may be displayed to a user in accordance with certain embodiments of the present invention.

DETAILED DESCRIPTION OF THE INVENTION

Figure 1:
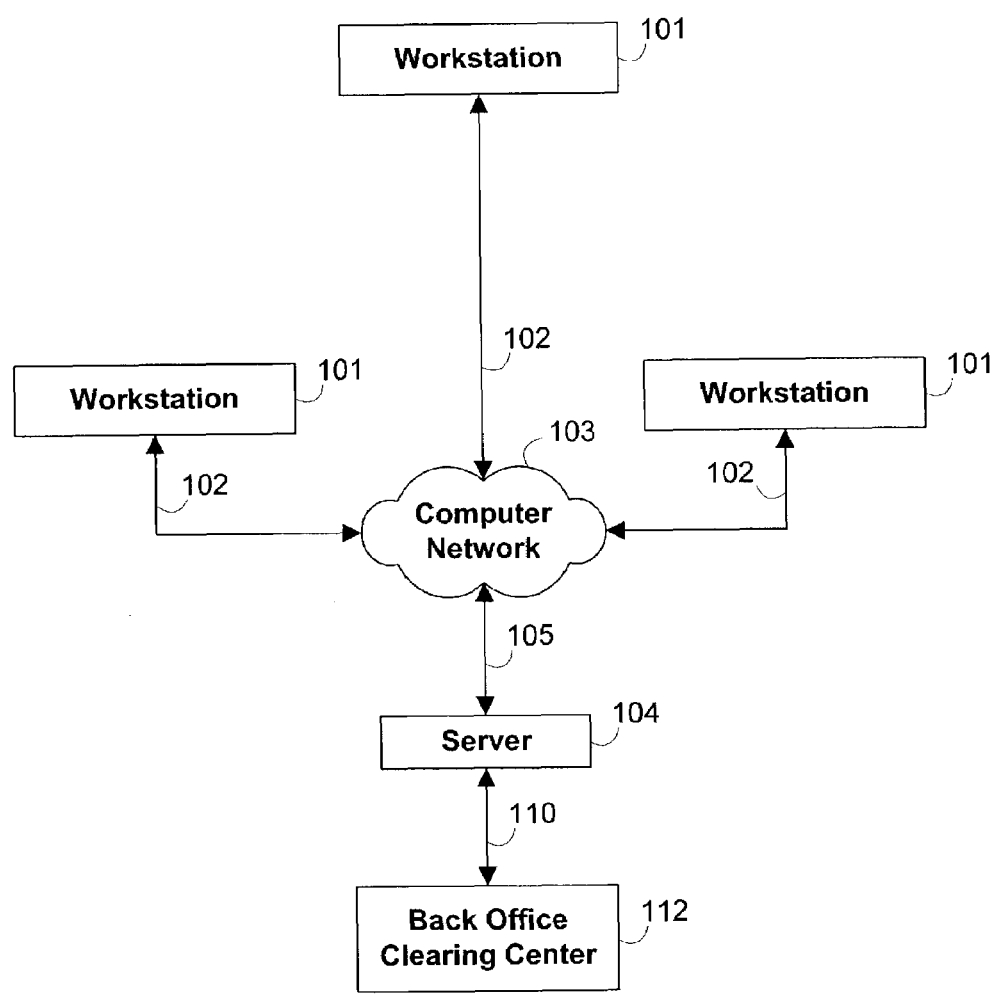
FIG. 1 is a block diagram of a system that may be used to implement the processes and functions of certain embodiments of the present invention.

Referring to FIG. 1, exemplary system 100 for implementing the present invention is shown. As illustrated, system 100 may include one or more workstations 101. Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, data processing device, or combination of the same. Server 104 may be used to process and settle the executed trades, calculate commissions for potential trades as well as for actual trades, and provide information that may be used to display calculated commissions.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 101 may be used to enter into and proceed with the trades that relate to the present invention, and display trade and/or commission information to users of system 100.

Back office clearing center 112 may be any suitable equipment, such as a computer, a laptop computer, a mainframe computer, etc., or any combination of the same, for causing trades to be cleared and/or verifying that trades are cleared. Communications link 110 may be any communications links suitable for communicating data between server 104 and back office clearing center 112, such as network links, dial-up links, wireless links, hard-wired links, etc.

Figure 2:
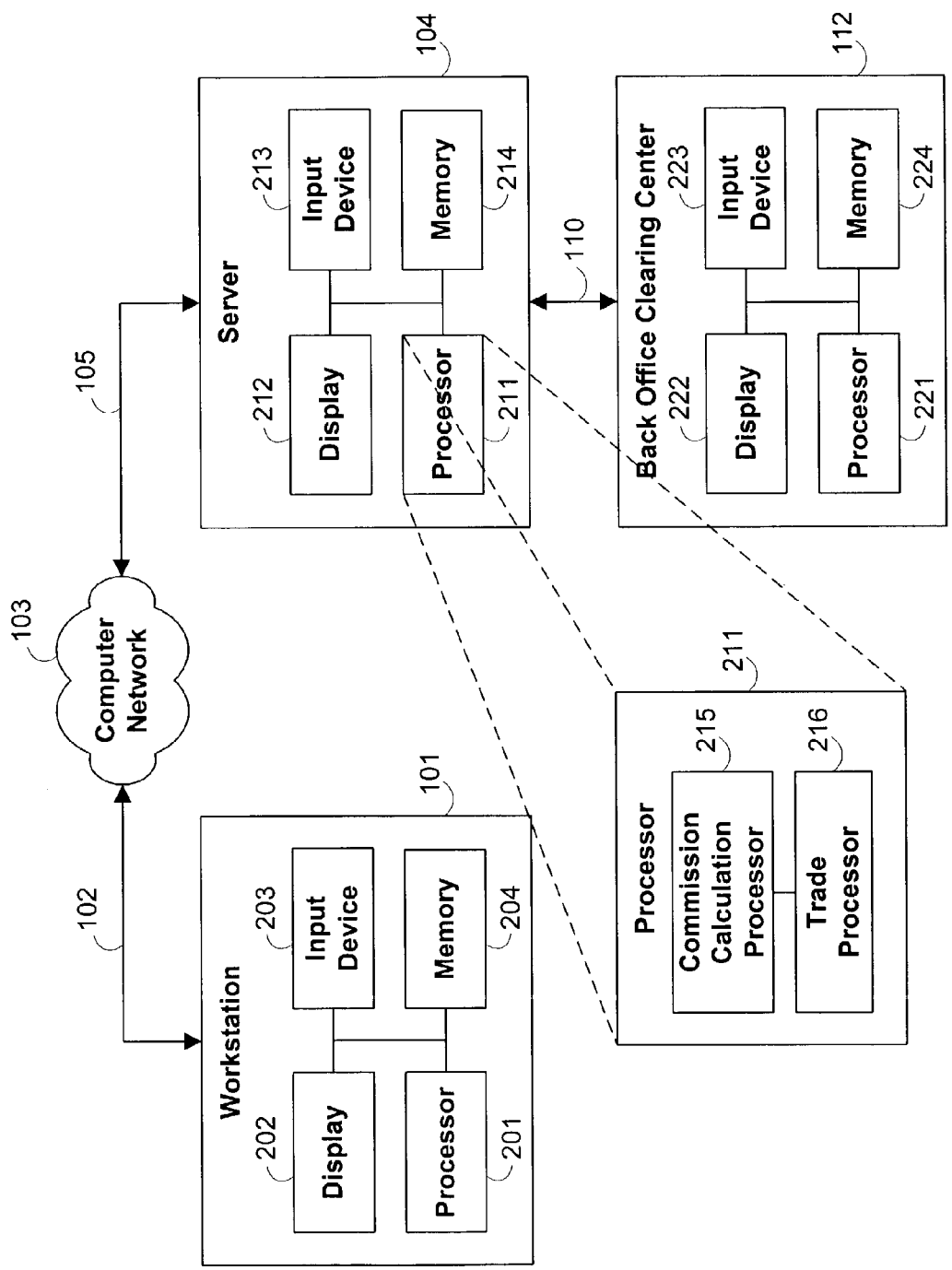
FIG. 2 is a block diagram of a workstation, a server, and a back office clearing center that may be used to implement the processes and functions of certain embodiments of the present invention.

The server, the back office clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. Processor 201 may use the workstation program to present on display 202 trade information relating to bids, offers, executed trades, and commission information to a user of workstation 101. Furthermore, input device 203 may be used by the user to enter such bids and offers, modify them, and to enter into trades involving the interest-rate-related instruments.

Server 104 may include processor 211, display 212, input device 213, and memory 214, which may be interconnected. In a preferred embodiment, memory 214 contains a storage device for storing trade information as well as commission information. The storage device further contains a server program for controlling processor 211. Processor 211 uses the server program to transact the purchase and sale of the interest-rate-related instruments. Processor 211 may include commission calculation processor 215 that determines the commissions based on market conditions or other criteria that may relate to the commissions. Processor 211 may include trade processor 216 that executes and processes trades.

Back office clearing center 112 may include processor 221, display 222, input device 223, and memory 224, which may be interconnected. In a preferred embodiment, memory 224 contains a storage device for storing a clearing program for controlling processor 221. Processor 221 uses the clearing program to clear executed trades, thereby facilitating the transfer of securities resulting from the executed trades. Clearing executed trades may preferably include exchanging currency for an instrument.

Figure 3:
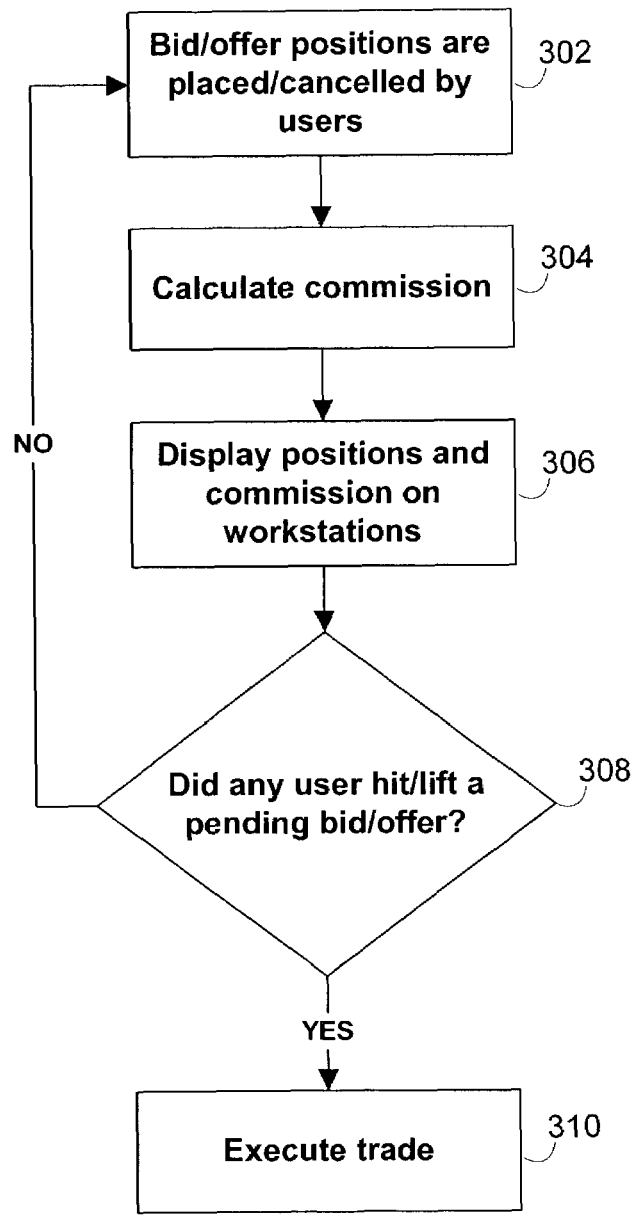
FIG. 3 is a preferred flow diagram of a process that may be used in the execution of a trade in accordance with certain embodiments of the present invention.

A method according to a preferred embodiment of the present invention is depicted in FIG. 3. Process 300 of FIG. 3 may be implemented on system 100 of FIGS. 1 and 2, in accordance with the principles of the present invention. In process 300, a user may place one or more bids and/or offers for a defined class of securities, at step 302. The user may be the customer himself, a broker acting on behalf of the customer, or any other member of the group defined above as participants.

The system may therefore receive the bid/offer positions entered by the user. Next, the commission for the potential trade may be calculated at step 304, based on the received information. Commission calculation, which will be described in more detail in relation to FIG. 5, may be implemented by commission calculation processor 215, shown in FIG. 2. At step 306, the entered bid/offer positions may be displayed along with the calculated (albeit prospective) commission for the pending trade. A workstation display, such as element 202 of FIG. 2, may be used to display the bid/offer positions and commission information to the user, as will be discussed in more detail in FIG. 8.

It should be noted that, in selected embodiments, payment of commission may be received only from the aggressing party—i.e., the party that either hits the bid or lifts the offer. In other embodiments, the commission may be received from each party involved in the transaction.

The positions that are still pending, along with the commissions associated with each trade based on such positions, may be arranged and displayed in priority according to a predetermined protocol. A user may establish priority by placing a bid or offer at a select price and size. Priority may be based upon time of submission, price, size, or any other suitable criterion. By way of example, the highest bid may be displayed on the screen above other bids, and bids at the same price may be displayed in the time order in which they enter the system.

Once the bid and offer positions are displayed on the workstations, they may be accepted by another user, or counterparty. Process 300 then determines whether any user has accepted a pending bid or offer at step 308. Once a user has accepted a pending bid or a pending offer, the trade may be executed at step 310 and the commission pertaining to the executed trade may be displayed again to the user for confirmation. Trade processor 216, shown in FIG. 2 may be used to execute and process the trade at step 310. If no customer accepts a pending bid or offer at step 308, no trade will be executed and the display on the screen may remain the same unless a user places or changes a bid or offer at step 302.

Figure 4:
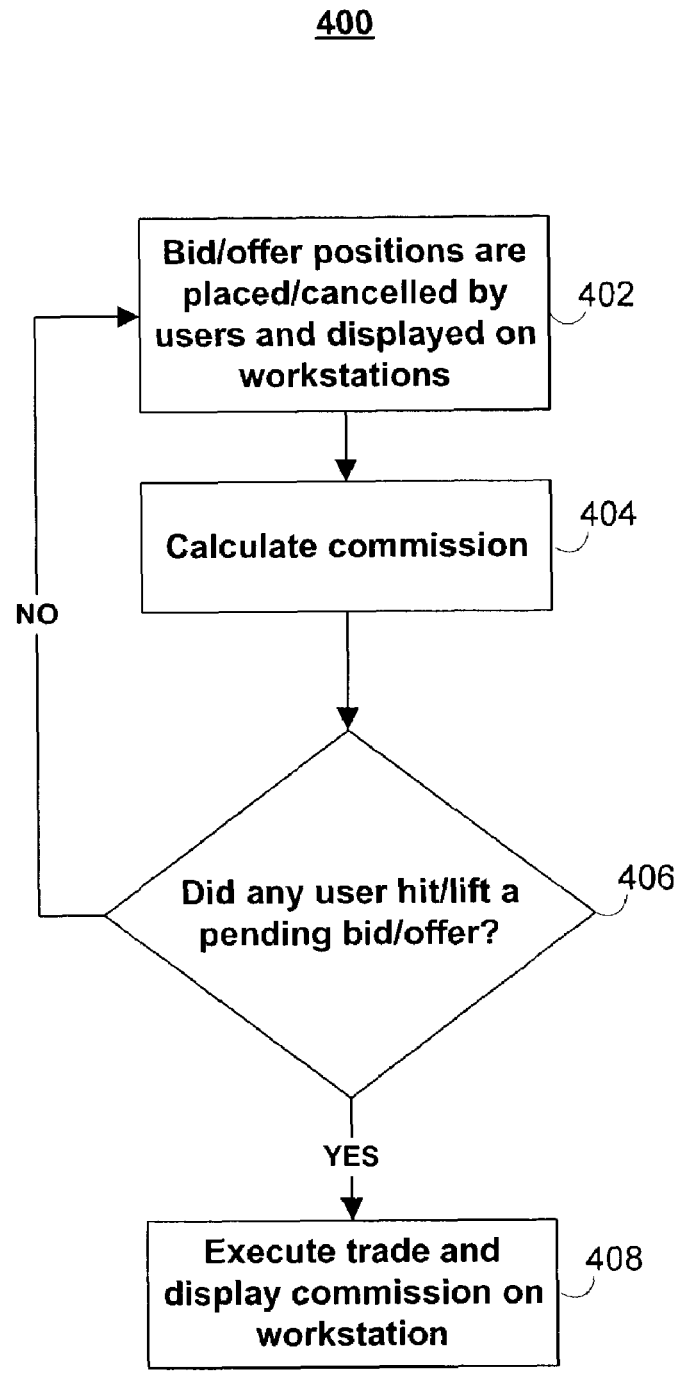
FIG. 4 is another flow diagram of a process that may be used in the execution of a trade in accordance with certain embodiments of the present invention.

Alternatively and in another embodiment, a method according to the present invention is depicted in FIG. 4. Process 400 of FIG. 4 may be implemented on system 100 of FIGS. 1 and 2 as well, in accordance with the principles of the present invention. In process 400, the user may place one or more bids or offers for a defined class of securities, at step 402. The entered bid or offer positions may be arranged according to the predetermined protocol mentioned above, which may be implemented by server 104 of FIGS. 1 and 2. The bid or offer positions may also be displayed to the user on workstation 101 of FIGS. 1 and 2. The commission for the potential trade may then be calculated at step 404, based on the received information, using commission calculation processor 215, shown in FIG. 2.

Next, process 400 may determine whether any user has accepted a pending bid/offer at step 406. If no customer accepts a pending bid or offer at step 406, no trade will be executed and the display on the screen may remain the same unless a user places or changes a bid or offer at step 402. Once a user accepts a pending bid/offer, the trade may be executed at step 408 by trade processor 216, shown in FIG. 2. The commission that is calculated based on the executed trade may be displayed to the user at step 408 as well.

Figure 5:
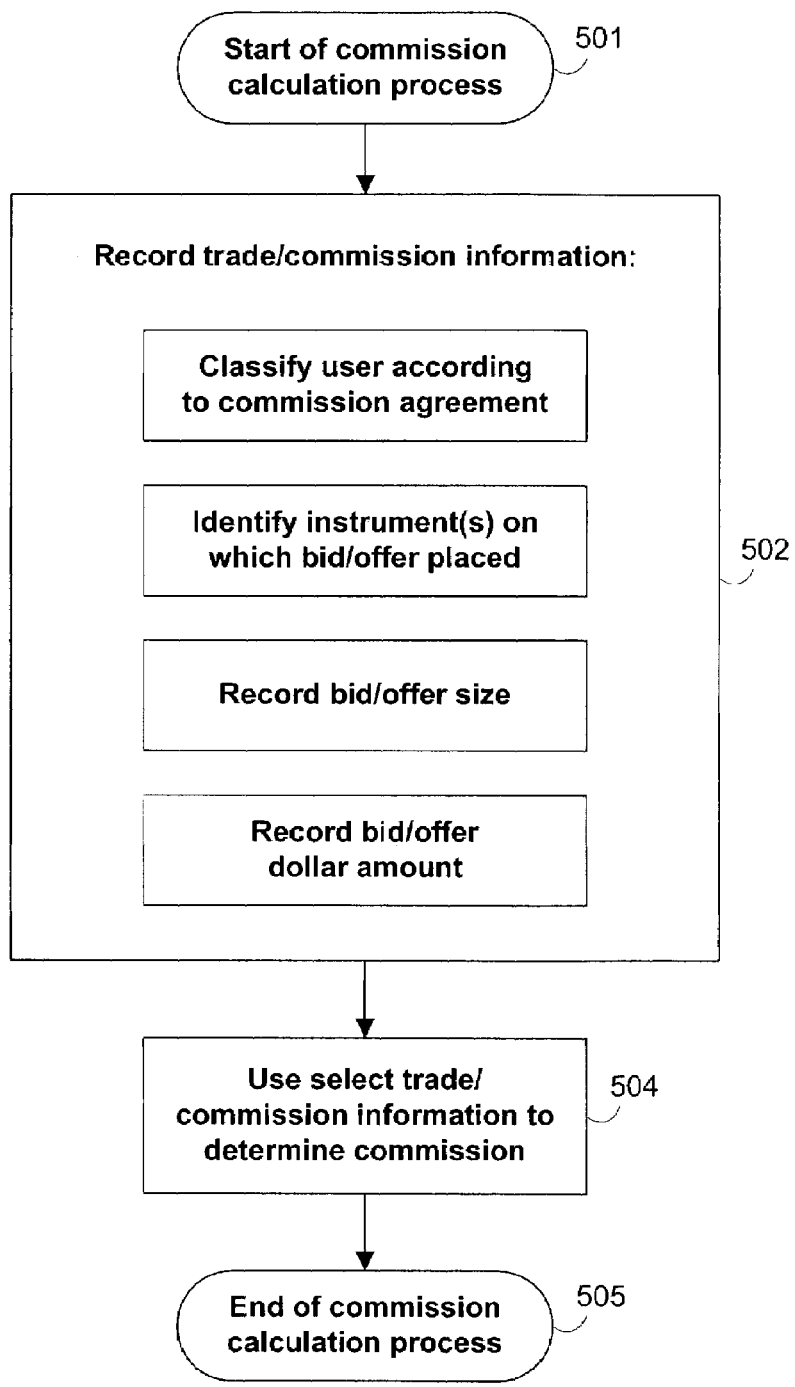
FIG. 5 is a flow diagram of a process that may be used in the calculation of a commission pertaining to a trade in accordance with certain embodiments of the present invention.

Commission calculation according to steps 304 or 404 of FIGS. 3 and 4 may be implemented by process 500 shown in FIG. 5. Commission calculation processor 215, shown in FIG. 2, may be used to run process 500. Referring to FIG. 5, process 500 may start at step 501. Process 500 may collect and record information relating to the calculation and allocation of the commission associated with the position entered by the user at step 502. Such information may include the user commission agreement type, the specific type or class of instrument on which bids/offers were placed, the bid/offer size, and/or the dollar amount per bid/offer.

Users may be classified according to their type of commission agreement at step 502. For example, some users may have an agreement for a flat periodic rate (monthly, yearly, etc.) for their commissions. These users would be charged the same monthly or yearly rate regardless of the number of transactions they make. Such users may be classified as ones having a "Master Agreement." Other users may have to pay a commission for each transaction they participate or, alternatively, in each transaction in which they aggress. Such users may be classified as ones having a "Transaction" type agreement.

In addition, the instrument or instruments on which bids/offers are placed by a particular user are identified, at step 502, according to whether they pertain to a particular class of financial instruments such as interest-rate-related securities, currencies, equities, and their derivatives, or whether they represent bonds, currency, stocks, options, etc. They may even be classified in more detail according to, for example, their year-to-maturity. Also, for each one of these instruments, the bid/offer size and dollar amount placed by a user may be recorded. Such trade information (or position-specific information), as well as other suitable commission information may be used to calculate the commission on the potential trade that may take place if the user were to hit/lift one or more pending bids/offers or, alternatively, have his bid hit or his offer lifted.

At step 504, the trade and commission information gathered in step 502 is used to determine the dollar amount of the commission that may be charged to the user. In some cases this dollar amount may be zero. For example, if the information recorded for a particular user reveals that the user has a master agreement for a fixed annual sum of money, then the marginal cost of a transaction will be zero unless a designated increment stated in the user's contract is specified.

FIGS. 3 and 4 show commission calculation steps 304 and 404 occurring prior to the execution of the trade. In order for the commission to be fully and clearly disclosed to the user prior to the user hitting or lifting a pending bid or offer as shown in FIG. 3, commission calculation step 304 preferably takes place prior to the execution of the trade. The same is not necessarily true with respect to FIG. 4 because the commission need not be displayed until the trade is executed. However, there may be other advantages for step 404 to take place prior to steps 406 and 408. Some of these advantages are discussed below.

Although some users may not complete or fully engage in a transaction, they may still participate in some aspects of a trade. For instance, those users may post bids or offers, or browse through posted bids and offers in search of potential hits or lifts. In doing so, such users may provide the market with additional liquidity. Step 502 of FIG. 5 may be used to characterize such users by gathering information relating to the potential transactions in which they may be considered participants. For example, the volume of bids and offers placed on a specific instrument by a particular user may be used as a measure of liquidity added to a rarely traded instrument, or may be an indication as to whether the user is a relatively new participant. Such user behavior may warrant an increase in the user's credit line or margin requirement, thereby benefiting the user. This type of determination is made possible through step 502 of FIG. 5.

Figure 6:
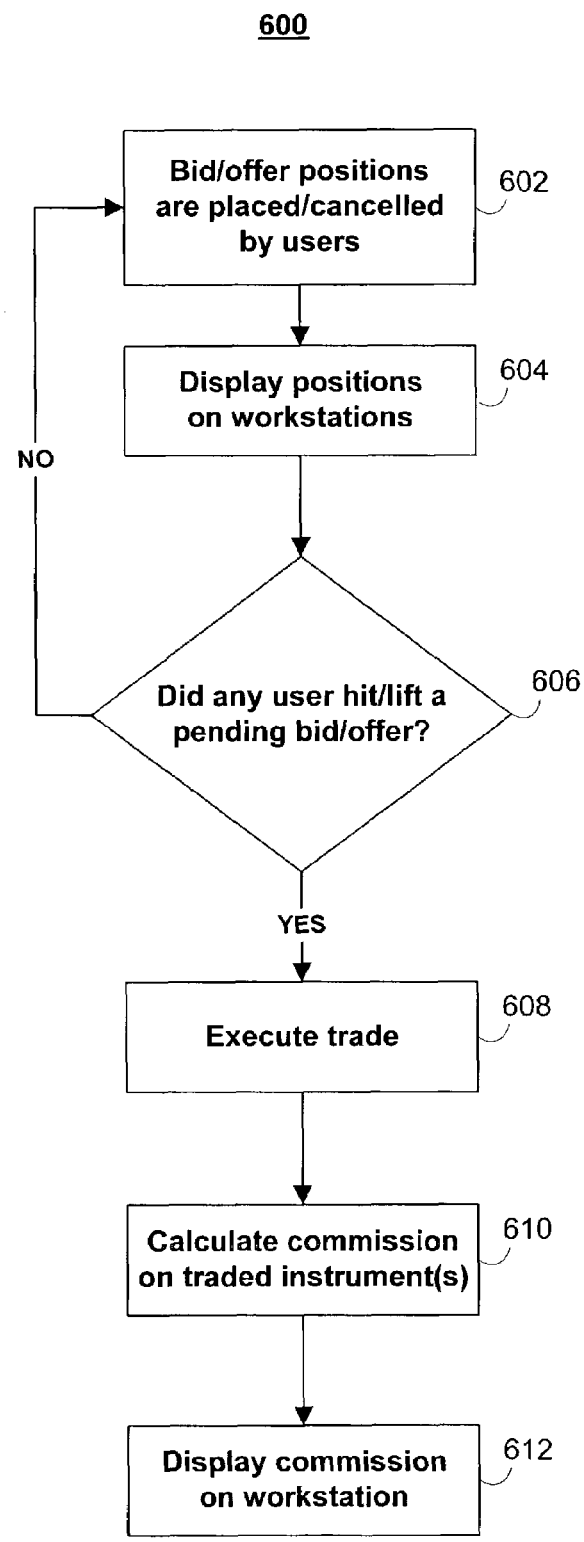
FIG. 6 is yet another flow diagram of a process that may be used in the execution of a trade in accordance with certain embodiments of the present invention.

Alternatively and in another embodiment, a method according to the present invention is depicted in FIG. 6, whereby commission calculation need not take place until the trade is executed. Process 600 of FIG. 6, which may be implemented on system 100 of FIGS. 1 and 2 in accordance with the principles of the present invention, starts at step 602. At step 602, the user may place one or more bids or offers for a defined class of securities. The bid and offer positions are displayed on the workstations at step 604 and may be accepted by the user at step 606. If no customer accepts a pending bid or offer at step 606, no trade will be executed and the display on the screen may remain the same unless a user places or changes a bid or offer at step 602. Once a user accepts a pending bid or offer, the trade may be executed at step 608 by trade processor 216, shown in FIG. 2.

After the trade is executed, the commission on the trade may be calculated based on the instruments that were involved in the completed transaction at step 610, and displayed to the user at step 612. The commission calculation may be implemented by commission calculation processor 215 or FIG. 2, in accordance with process 500 of FIG. 5. Instead of identifying the type, size and dollar amount of instruments on which bids/offers were placed, however, the type, size, and dollar amount of instruments that were transacted in the executed trade are identified and recorded.

Figure 7:
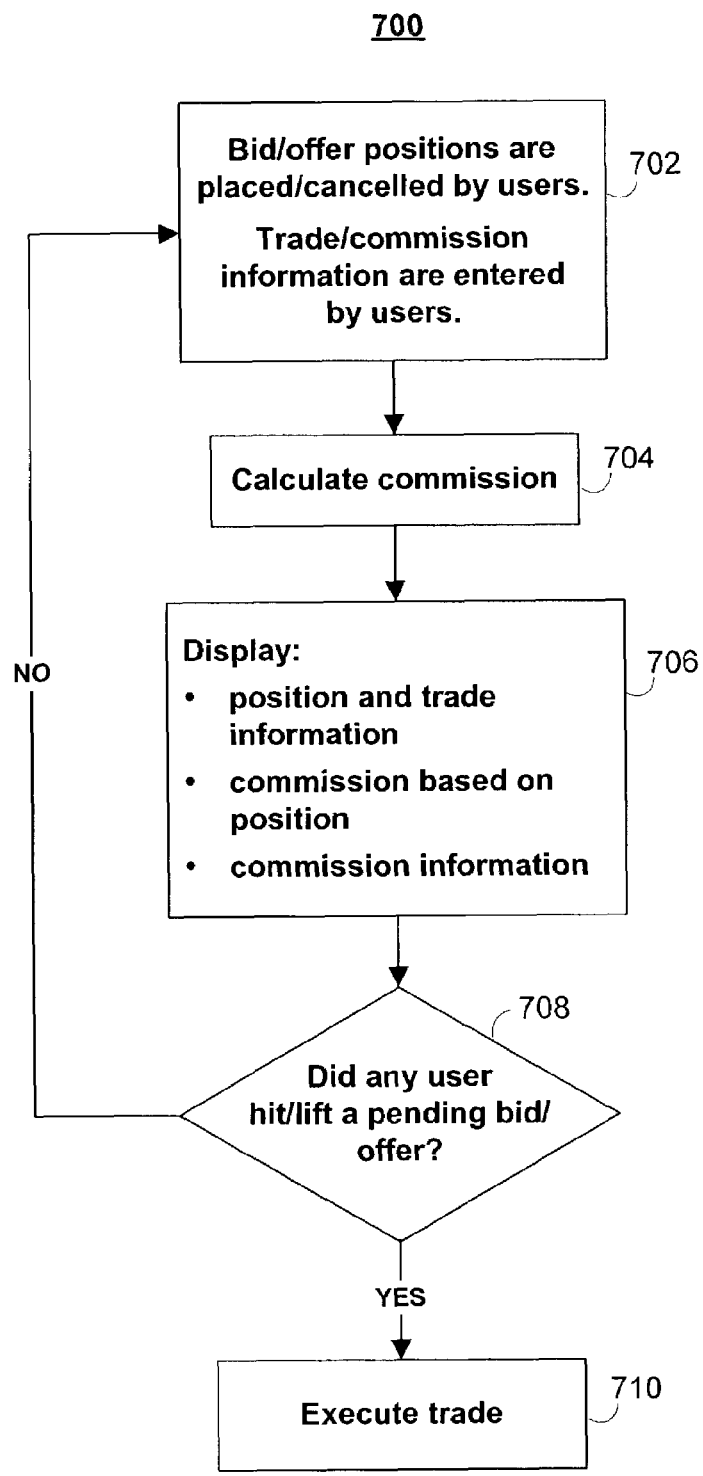
FIG. 7 is another preferred flow diagram of a process that may be used in the execution of a trade in accordance with certain embodiments of the present invention.

It may however be more desirable to provide a method for electronically trading that fully and clearly discloses the commission charged to the users prior to the execution of the trade as shown in FIG. 3. In addition, it would be advantageous to inform the user about the factors that form the basis for the calculation of the commission, so that the user may have a better understanding of the process involved in allocating the commission, and so that he may influence such factors. FIG. 7 illustrates a process that enables the user to view and/or control such factors, according to another preferred embodiment of the present invention.

Process 700 of FIG. 7 may be implemented on system 100 of FIGS. 1 and 2, in accordance with the principles of the present invention. The user may place one or more bid and/or offer for a defined class of securities, at step 702. The user may also enter or change his trade information, commission information, or both. For example, the user may modify his type of commission agreement, at step 702.

As a security arrangement, each particular agreement may be associated with a code that may match the user's location and/or other identifying features. Furthermore, a particular commission agreement identifier may ensure that the user does not change his particular information to an agreement that is more beneficial to him. Thus, a double key may be set up between the trading system and the user whereby each party preferably enters a particular code such that the commission agreement may not be changed by either party unilaterally.

Next, the commission for the potential trade may be calculated at step 704, based on the information entered by the user and identified by the system. Commission calculation may be implemented by commission calculation processor 215, shown in FIG. 2, and in accordance with process 500 of FIG. 5. At step 706, the entered bid/offer positions, trade information, and/or calculated commission may be displayed along with the user's commission information. A workstation display, such as element 202 of FIG. 2, may be used to display an interactive view region on which the bid/offer positions and commission information may be shown to the user. Such an interactive view region is illustrated in and discussed in conjunction with FIG. 8.

After the positions and commissions are displayed to the user at step 706, process 700 may determine whether any user hit/lifted a pending bid/offer at step 708. After learning the potential commission that he may be charged, the user may choose to modify some of the information entered in order to influence the calculated commission. At step 708, the user may be prompted as to whether the displayed trade information and/or commission information is accurate or acceptable. By not accepting or by choosing not to hit or lift any pending position, the user may be taken back to step 702 where he may enter or update his positions and/or commission information. For example, by changing his type of commission agreement and/or size of bids/offers, the user may reduce the total dollar amount of commissions charged to him or, alternatively, reduce the amount of commissions on a per contract basis. The user may also choose to place bids/offers on less liquid instruments. Participation in markets of less liquid instruments may also benefit the user by rewarding him for such participation, as described above. A workstation, such as element 202 of FIG. 2, may be used to display a dialog box that allows the user to enter/modify trade information and/or enter the changes relating to his commission information, as discussed above. Such a dialog box is illustrated in and discussed in conjunction with FIG. 9.

Once a user has accepted a pending bid or a pending offer, the trade may be executed at step 710 and the commission pertaining to the executed trade may be displayed again to the user. Trade processor 216, shown in FIG. 2 may be used to execute and process the trade at step 710. If no customer accepts a pending bid or offer at step 708, no trade will be executed and the display on the screen may remain the same unless a user places or changes a bid or offer, or unless the user changes the trade and/or commission information at step 702.

Information relating to the positions placed by a user as well as the user's commission information may be provided to the user. Interactive region 800 illustrated in FIG. 8 may display such information to the user on display 202 of workstation 101 of FIG. 2. Interactive region 800 may be customized by each user and may contain selectively configured screen regions 81, 82, and 83. Each region may be dedicated to a type of instrument being traded. For example, region 81 may relate to U.S. treasury securities, wherein subregion 810 is specific to 2-year treasury securities, subregion 812 to 5-year treasury securities, subregion 814 to 10-year treasury securities, etc. For each particular type of issue, the latest key trading indicators may be displayed within a subregion, such as: the bid, the offer, the bid/offer sizes, and the commission charged to the user. The user may customize the subregion to display other information, such as the latest settling price or the total volume traded by the particular user. The user may also mark each component within a particular subregion with a color, or in any other suitable manner, to indicate features of that component, facilitate viewing of each component, or both. Other information particular to treasury securities may also be displayed, such as: the issue date, the maturity date, the interest rate, the calculated yield, etc. The information displayed may preferably be updated in real-time as the different instruments are traded.

In addition, window 888 may display information that is specific to the user or that relates to the commissions he may be charged. Such information may include the user or customer identification number, the user's commission agreement type, whether or not the user is an aggressor in a particular transaction, the liquidity of the particular instrument selected by the user, the total volume of trades the user participated in or entered into, the current date and time, or other suitable information.

In order to select a particular issue, the user may move box 801 to the desired area within a subregion through his keyboard, mouse, or any type of input device such as element 203 of workstation 101 depicted in FIG. 2. Once the user selects a particular issue, he may place or cancel one or more bid/offer on it, hit/lift a particular bid/offer, change his commission agreement, or simply move to a different issue again using the input device. For example, FIG. 8 shows box 801 highlighting an offer to sell 200 issues of 5-year treasury notes at $100.22 each. This particular instrument is indicated to be highly liquid, and is not associated with a marginal commission because this particular user's commission agreement reflects a master type agreement. In this example, the treasury note bid and offer prices, as well as the commission on the trade, are expressed in real dollar amounts. Alternatively, the bid/offer prices may be expressed in terms of basis points. Also, the commission on any particular transaction may be expressed in terms of a percentage of a basis point or a percentage of the spread of the transaction. The user may select the manner in which such trade and commission information are displayed.

As will be discussed in detail in the following, the user may transact any one of the instruments shown in FIG. 8 by bidding for, offering, buying or selling the instrument shown within a particular subregion. Moreover, the user may build multiple transactions or a multi-legged transaction on the same instrument. For example, the user may bid for certain issues of 5-year treasury notes and offer certain issues of the same 5-year treasury notes for sale at a different time, hoping that price fluctuations relating to this particular instrument may be to his advantage. The user may use interactive region 800 to do so. The commissions on each of these transactions may be calculated, combined and displayed as a commission on a single multi-legged transaction in interactive region 800.

In order to bid for, offer, buy or sell an instrument shown within a subregion, the user may submit a trading command indicating the action to be taken using different methods. For example, the user may submit the trading command using a command-line interface, by moving box 801 of FIG. 8 through his keyboard to any location within a particular subregion and manually enter a command line on his keyboard. The keyboard may also include buttons specifically designed to enter specific trade commands. Alternatively, the user may use a mouse or pointing device to move box 801 to a particular component within a specific subregion and press the button on the pointing device that is associated with a particular trade command. The user may alternatively use some combination of both a keyboard and pointing device to enter trade commands, particularly when building multi-legged transactions. In any event, the aforementioned keyboard and pointing device may be types of input devices provided to the user as part of an associated workstation, as depicted in FIG. 2. The user may use such an input device to modify at least some of the information displayed in window 888 of FIG. 8 as well.

Figure 9:
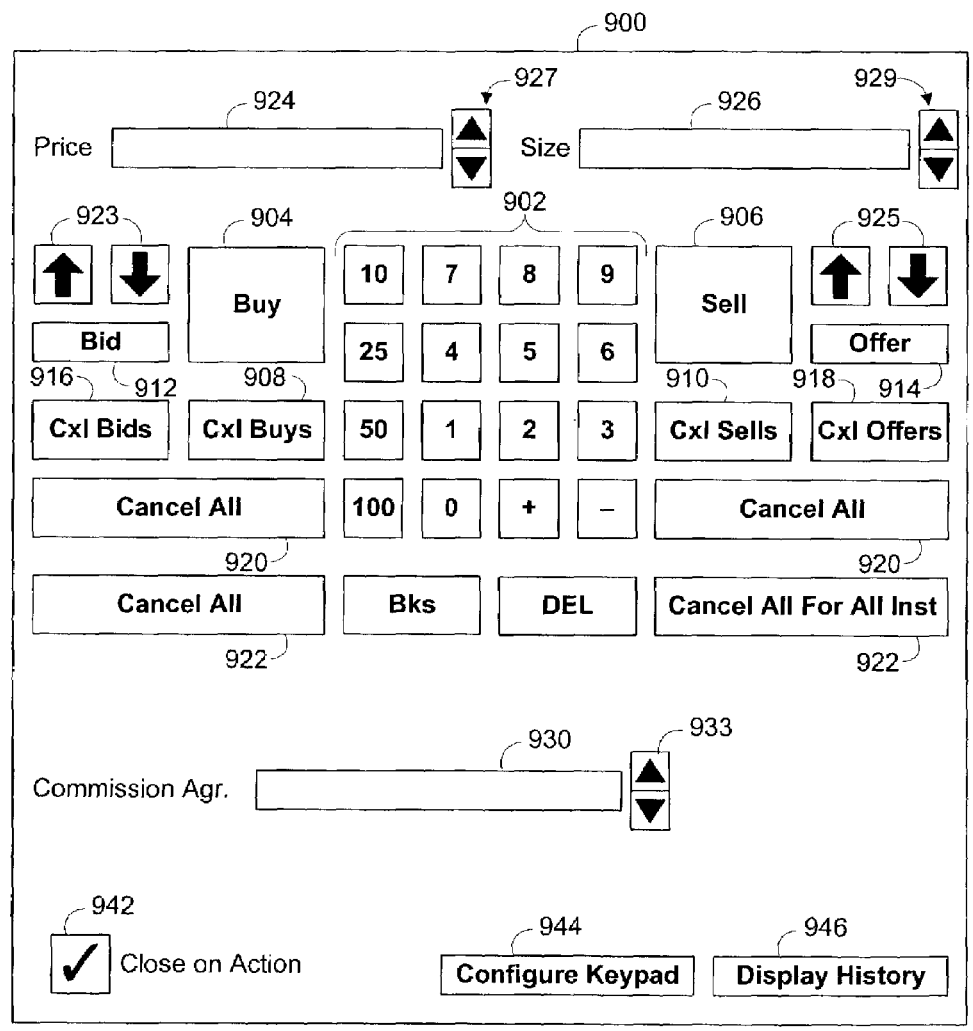
FIG. 9 is an illustration of a dialog box that may be displayed to a user in accordance with certain embodiments of the present invention.

In another embodiment, selecting a particular instrument displayed in interactive view region 800 may open a dialog box that is displayed to the user on the same screen. Such a dialog box is illustrated in FIG. 9. Dialog box 900 may be a graphical interface for submitting trading commands. Dialog box 900 may be opened automatically and/or manually before, during, and/or after a trade, and may allow the user to submit a trade command at any time. A dialog box may be dedicated to each type of instrument available in interactive view region 800 of FIG. 8, such that many dialog boxes may be open and kept open at any one time. Dialog box 900 may contain buttons and entry fields 902-946. Buttons and entry fields 902-929 may be used to submit a bid command, an offer command, a buy command, or a sell command for an instrument corresponding to a particular subregion in FIG. 8. Buttons and entry fields 930 and 933 may be used to enter or change the user's commission agreement type. Box and buttons 942-946 may be used to change certain options available within dialog box 900, and list a history of transactions.

A particular set of buttons in dialog box 900 constitute a numeric keypad 902 that may provide buttons for numbers zero through nine, and may contain buttons for numbers ten, twenty-five, fifty, and one hundred or any other suitable or desirable values. Numeric keypad 902 may also contain a plus button ("+"), a minus button ("−"), a decimal point button ("."), a backspace button ("BKS"), and a delete button ("DEL").

In addition, dialog box 900 may also provide the user with a buy button 904, a sell button 906, a cancel buys button 908, a cancel sells button 910, a bid button 912, an offer button 914, a cancel bids button 916, a cancel offers button 918, cancel all buttons 920, cancel all for all instruments buttons 922, a price entry field 924, price up and down buttons 927, bid price up and down buttons 923, offer price up and down buttons 925, a size entry field 926, and size up and down buttons 929.

Referring to FIG. 8, when a user selects an offer for a 5-year treasury note—e.g., by clicking on box 801 or pressing enter while the box is positioned under the offer column within subregion 812—dialog box 900 of FIG. 9 may pop-up (if not already open), and a pointer that is being used by the user may be immediately redirected to offer button 914 to save the trader the time of repositioning the pointer to that location. The user may then use any of buttons and entry fields 902-929 to modify his trade and/or position or cancel any given orders. Otherwise, or if the user does not wish to change the offer price or any other information relating to this particular offer, the user may press on the offer button to confirm and submit the trade command.

For example, assuming that the user wants to decrease the offer price to $100.20 with regards to the 5-year treasury note, he may press offer button 914 once and thereby cause offer price $100.22 (as illustrated in FIG. 8) to appear in price entry field 924. To decrease the offer price, he may press price down button 927, or press offer price down button 925. The user may then click on offer button 914 again to submit the offer.

Alternatively, if the user does not want to alter the price, he may double click immediately on offer button 914.

Although the previous is an example of how a user may submit an offer to sell a particular instrument, it should be obvious to those of ordinary skill in the art that the same features of the present invention are available in bidding for any instrument. Similarly, to buy or sell a desired number of issues of a particular instrument, buy and sell buttons 904 and 906 may be used, respectively, and in conjunction with size buttons 929.

Entry field 930 and buttons 933 of dialog box 900 may be used to change the user commission agreement. For example, if the user wishes to modify his commission agreement with respect to a particular instrument, he may bring up dialog box 900 by clicking anywhere within the subregion of FIG. 8 that is associated with the instrument and browse through the commission agreement options available to him by scrolling from one type that appears in entry field 930 to another by pressing buttons 933. The commission agreement implemented is the one displayed in field 930. Alternatively, the user may select a type of commission agreement that will globally apply to all the trades he may effectuate by clicking on the "commission agreement" field in window 888 of interactive view region 800 shown in FIG. 8, thereby causing dialog box 900 of FIG. 9 to appear, and selected his desired commission agreement type.

However, as mentioned before, a double key may be set up between the trading system and the user whereby each party entering into a transaction preferably enters a particular code such that the commission agreement may not be changed by either party unilaterally. Also, the user's customer ID may be used to ensure that the user does not change his particular commission information at will.

Dialogue box 900 of FIG. 9 may also contain close on action box 942 which, when selected, may cause dialogue box 900 to close automatically when the user performs a certain action such as complete a bid, offer, buy or sale. Configure keypad button 944 may be used to reposition the buttons and entry fields on dialog box 900, change the functions associated with these buttons and entry fields, or customize dialog box 900 according to the user's preferences. Finally, display history button 946 may cause a history list of order and trade entries to be displayed when pressed.

Interactive view region 800 and dialog box 900 of FIGS. 8 and 9, respectively, may be altered to display position or trade information, commission information, or both, in accordance with any of processes 300, 400, 600, and 700 of FIGS. 3, 4, 6, and 7, respectively. A particular user may place or accept positions, change the factors that influence the commission charged to him, or both, as discussed above.

Finally, one of ordinary skill in the art should appreciate that the present invention may be practiced in embodiments other than those illustrated herein without departing from the spirit and scope of the invention, and that the invention is only limited by the claims which follow.

What is claimed is:

1. A method comprising the steps of:
   transmitting electronic data to a computer associated with a counterparty customer of an electronic trading system for tradeable presentation to the counterparty customer, the transmitted electronic data representing a bid or offer position for a proposed trade of an instrument-rate-related instrument that was entered by an order-placing customer, the transmitted electronic data including a prospective commission calculated for a trade by the counterparty customer for transacting at least a part of the bid or offer position, the counterparty's computer designed to tradeably present the electronic data for the proposed trade to the counterparty customer for trading;
   receiving data representing an instruction from an order-modifying customer of the electronic trading system to modify the bid or offer position in a manner that influences the commission; and
   computing an updated commission based on the instruction received from the order-modifying customer modifying the bid or offer position, and tradeably presenting electronic data representing the modified bid or offer position and the computed updated commission to the counterparty customer, the updating and presenting of the commission electronic data being performed in computers in substantially real time response to the instruction.

2. The method of claim 1 wherein the commission is further calculated based on a bid or offer size of the bid or offer position, the instruction to modify comprises instruction to change the bid or offer size, and the prospective commission is calculated based on the change in the bid or offer size of the bid or offer position.

3. The method of claim 1 wherein the commission is further calculated based on a dollar amount of the bid or offer position, the instruction to modify comprises instruction to change the dollar amount of the bid or offer position, and the prospective commission is calculated based on the change in the dollar amount of the bid or offer position.

4. The method of claim 1, wherein:
   the counterparty customer and order-placing customer are the same entity, and the order-modifying customer is a different entity than the counterparty customer.

5. The method of claim 1, wherein:
   the counterparty customer and order-modifying customer are the same entity, and the order-placing customer is a different entity than the counterparty customer.

6. The method of claim 1, wherein:
   the real time updating of the display of the bid or offer position with its updated calculated prospective commission is displayed on a market screen of bid and/or offer positions available to be hit or lifted.

7. The method of claim 1, wherein:
   the real time updating of the display of the bid or offer position with its updated calculated prospective commission is displayed on a negotiation screen for proposing a counter-offer to a bid and/or offer position entered by the non-counterparty customer.

8. The method of claim 1, wherein:
   the bid or offer position is a multi-leg trade.

9. The method of claim 1, wherein:
   the price of the bid or offer position is displayed in terms of yield.

10. The method of claim 1, wherein:
    the price of the bid or offer position is displayed in relation to par.

11. The method of claim 1, wherein:
    the instruction from the order-modifying customer to modify the bid or offer position requests a modification of price.

12. The method of claim 1, wherein:
    the instruction from the order-modifying customer to modify the bid or offer position requests a modification of size.

13. The method of claim 1, wherein:
    the instruction from the order-modifying customer to modify the bid or offer position requests a modification of commission calculation method.

14. The method of claim 1, wherein:
the calculation of commission is based at least in part on the class of instrument that is subject of the bid or offer position.

15. An electronic trading system for an interest-rate-related instrument, the system comprising one or more tangible memories, the memories having stored therein one or more programs designed to cause computers of the electronic trading system to:
transmit electronic data to a computer associated with a counterparty customer of the electronic trading system for tradeable presentation to the counterparty customer, the transmitted electronic data representing a bid or offer position for a proposed trade of an instrument-rate-related instrument that was entered by an order-placing customer, the transmitted electronic data including a prospective commission calculated for a trade by the counterparty customer for transacting at least a part of the bid or offer position, the counterparty's computer designed to tradeably present the electronic data for the proposed trade to the counterparty customer for trading;
receive data representing an instruction from a computer of an order-modifying customer of the electronic trading system to modify the bid or offer position in a manner that influences the commission;
computing an updated commission based on the instruction received from the order-modifying customer modifying the bid or offer position, and to tradeably present electronic data representing the modified bid or offer position and the computed updated commission to the counterparty customer, the updating and presenting being performed in computers in substantially real time response to receiving the instruction.

16. The system of claim 15 wherein the commission is further calculated based on a bid or offer size of the bid or offer position, the instruction to modify comprises instruction to change the bid or offer size, and the prospective commission is calculated based on the change in the bid or offer size of the bid or offer position.

17. The system of claim 15 wherein the commission is further calculated based on a dollar amount of the bid or offer position, the instruction to modify comprises instruction to change the dollar amount of the bid or offer position, and the prospective commission is calculated based on the change in the dollar amount of the bid or offer position.

18. The system of claim 15, wherein:
the counterparty customer and order-placing customer are the same entity, and the order-modifying customer is a different entity than the counterparty customer.

19. The system of claim 15, wherein:
the counterparty and order-modifying customer are the same entity, and the order-placing customer is a different entity than the counterparty customer.

20. The system of claim 15, wherein:
the real time updating of the display of the bid or offer position with its updated calculated prospective commission is displayed on a market screen of bid and/or offer positions available to be hit or lifted.

21. The system of claim 15, wherein:
the real time updating of the display of the bid or offer position with its updated calculated prospective commission is displayed on a negotiation screen for proposing a counter-offer to a bid and/or offer position entered by the non-counterparty customer.

22. The system of claim 15, wherein:
the bid or offer position is a multi-leg trade.

23. The system of claim 15, wherein:
the price of the bid or offer position is displayed in terms of yield.

24. The system of claim 15, wherein:
the price of the bid or offer position is displayed in relation to par.

25. The system of claim 15, wherein:
the instruction from the order-modifying customer to modify the bid or offer position requests a modification of price.

26. The system of claim 15, wherein:
the instruction from the order-modifying customer to modify the bid or offer position requests a modification of size.

27. The system of claim 15, wherein:
the instruction from the order-modifying customer to modify the bid or offer position requests a modification of commission calculation method.

28. The system of claim 15, wherein:
the calculation of commission is based at least in part on the class of instrument that is subject of the bid or offer position.

29. A method comprising the steps of:
transmitting electronic data to a computer associated with a counterparty customer of an electronic trading system for tradeable presentation to the counterparty customer, the transmitted electronic data representing a proposed multi-leg trade of an instrument-rate-related instrument that was entered by an order-placing customer, the transmitted electronic data including a prospective commission calculated for the multi-leg trade for transacting the multi-leg trade, the counterparty's computer designed to tradeably present the electronic data for the multi-leg trade proposal and its commission to the counterparty customer for transacting the multi-leg trade;
receiving data representing an instruction from an order-modifying customer of the electronic trading system to modify the multi-leg trade proposal in a manner that influences the commission;
computing an updated calculated commission based on the instruction received from the order-modifying customer, and tradeably presenting the modified trade proposal and the updated calculated prospective commission to the counterparty customer using computers at a time that permits the counterparty customer to confirm the commission before executing the multi-leg trade.

30. The method of claim 29, wherein:
the updating and displaying are performed in substantially real time response to the modification instruction.

31. The method of claim 30, wherein:
the real time updating of the modified trade proposal with its updated calculated prospective commission is displayed on a market screen of bid and/or offer proposals.

32. The method of claim 31, wherein:
the real time updating of the display of modified trade proposal with its updated calculated prospective commission is displayed on a negotiation screen for proposing a counter-offer to the modified trade proposal entered by the non-counterparty customer.

33. The method of claim 29, wherein:
the price of the trade proposal is included in the transmitted electronic data in terms of yield.

34. The method of claim 29, wherein:
the instruction from the order-modifying customer to modify the trade proposal requests a modification of price.

35. The method of claim 29, wherein:
the instruction from the order-modifying customer to modify the trade proposal requests a modification of commission calculation method.

36. The method of claim 35, wherein:
the modification of commission calculation method requests a change from a per-trade commission to a commission calculated as a flat fee per unit of time.

37. An electronic trading system for an interest-rate-related instrument, the system comprising one or more tangible memories, the memories having stored therein one or more programs designed to cause computers of the electronic trading system to:
transmit electronic data to a computer associated with a counterparty customer of an electronic trading system, the transmitted electronic data representing a proposed multi-leg trade of an instrument-rate-related instrument that was entered by an order-placing customer, the counterparty's computer designed to tradably present the electronic data for the multi-leg trade proposal and its commission to the counterparty customer for transacting the multi-leg trade;
receive data representing an instruction from an order-modifying customer of the electronic trading system to modify the multi-leg trade proposal in a manner that influences the commission;
update the calculated commission based on the instruction received from the order-modifying customer, and tradeably present the electronic data describing the modified multi-leg trade proposal and the updated calculated prospective commission to the counterparty customer using computers at a time that permits the counterparty customer to confirm the commission before executing the multi-leg trade.

38. The electronic trading system of claim 37, wherein:
the updating and presenting are performed in substantially real time response to the modification instruction.

39. The electronic trading system of claim 37, wherein:
the real time updating of the modified trade proposal with its updated calculated prospective commission is displayed on a market screen of proposed trades.

40. The electronic trading system of claim 37, wherein:
the instruction from the order-modifying customer to modify the trade proposal requests a modification of commission calculation method.

41. The electronic trading system of claim 37, wherein:
the modification of commission calculation method requests a change from a commission calculated as a flat fee per unit of time to a per-trade commission.

* * * * *